(12) United States Patent
Hippeläinen

(10) Patent No.: US 6,516,996 B1
(45) Date of Patent: Feb. 11, 2003

(54) ELECTRONIC PAYMENT SYSTEM

(75) Inventor: Lassi Hippeläinen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/527,979

(22) Filed: Mar. 17, 2000

Related U.S. Application Data

(63) Continuation of application No. PCT/FI98/00761, filed on Sep. 25, 1998.

Foreign Application Priority Data

Sep. 25, 1997 (FI) .................................................. 973788

(51) Int. Cl.⁷ .............................................. G06F 17/60
(52) U.S. Cl. ...................... 235/379; 235/380; 705/34; 705/39; 705/40
(58) Field of Search ................................ 235/379, 380, 235/382

(56) References Cited

U.S. PATENT DOCUMENTS

| | | | | |
|---|---|---|---|---|
| 5,221,838 A | * | 6/1993 | Gutman et al. .............. | 235/379 |
| 5,586,036 A | | 12/1996 | Pintsov ........................ | 380/51 |
| 5,621,796 A | * | 4/1997 | Davis et al. .................. | 380/24 |
| 5,799,087 A | * | 8/1998 | Rosen ......................... | 235/379 |
| 5,844,218 A | * | 12/1998 | Kawan et al. ............... | 235/375 |
| 5,883,810 A | * | 3/1999 | Franklin et al. ............. | 235/379 |
| 5,884,288 A | * | 3/1999 | Chang et al. ................ | 235/379 |
| 6,032,857 A | * | 3/2000 | Kitagawa et al. ............ | 235/379 |
| 6,039,245 A | * | 3/2000 | Symmonds et al. ........ | 235/379 |
| RE36,788 E | * | 7/2000 | Mansveldt et al. .......... | 235/379 |
| 6,138,107 A | * | 10/2000 | Elgamal ...................... | 235/379 |

FOREIGN PATENT DOCUMENTS

| | | | | |
|---|---|---|---|---|
| DE | DL-0277141 | * | 3/1990 | ................. 235/449 |
| EP | 0172670 | | 2/1986 | |
| WO | WO 97/12344 | | 4/1997 | |
| WO | WO 97/17678 | | 5/1997 | |

OTHER PUBLICATIONS

Mouly, Michael and Pautet, Marie–Bernadette; "The GSM System for Mobile Communications", France: Cell & Sys, 1992.

* cited by examiner

Primary Examiner—Michael G. Lee
Assistant Examiner—Ahshik Kim
(74) Attorney, Agent, or Firm—Altera Law Group, LLC

(57) ABSTRACT

Equipment and method for acknowledging a transaction in an electronic payment system, comprising first processing means for providing electronic receipts corresponding to payments, second processing means for receiving said receipts, and transfer means for transferring said receipts between the first and second processing means. Said electronic receipt or part of it is encrypted with a public-key algorithm by using the payee's private key as an encryption key, and a receipt is decrypted with a public-key algorithm by using the payee's public key as s decryption key. If a recipient of the receipt wants to be convinced of the authenticity of the receipt, he decrypts the encryption by means of the payee's public key. Digital encryption with the payee's private key certifies the origin of the receipt undeniably. As long as the receipt is in encrypted form, it cannot be read without exactly knowing the payee, and counterfeiting of the receipt is impossible. An electronic receipt can be easily read and transferred between different destinations.

15 Claims, 2 Drawing Sheets

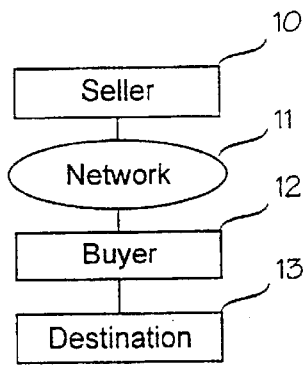
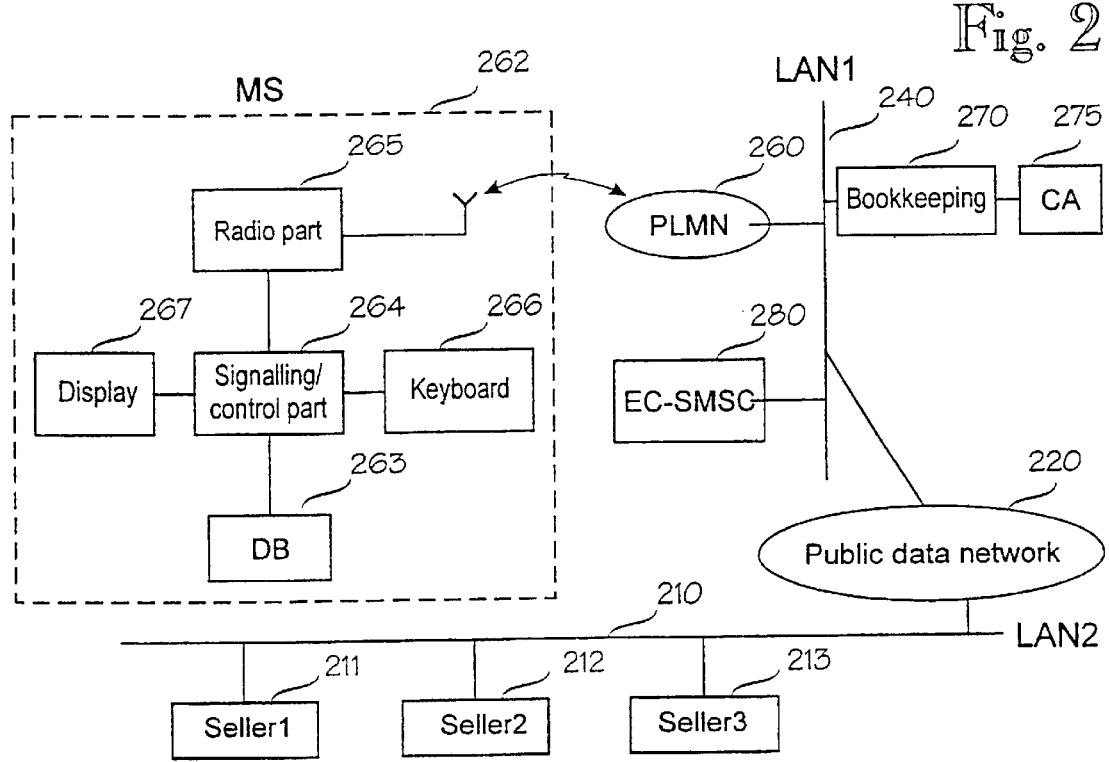
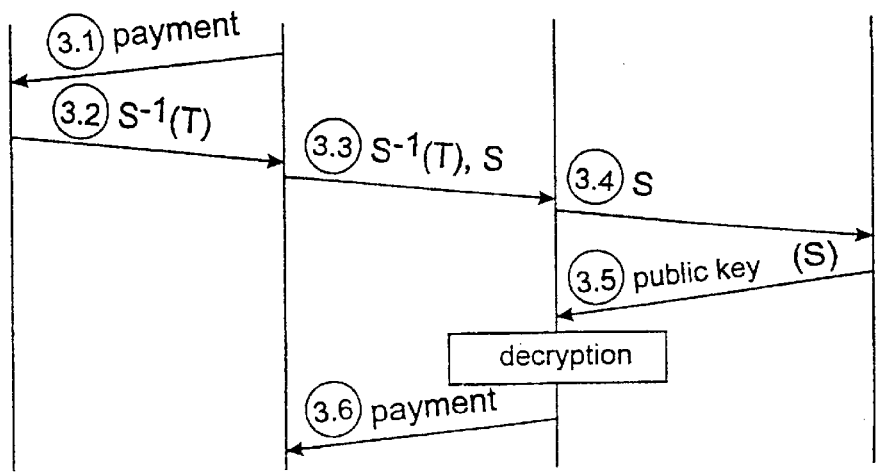

ELECTRONIC PAYMENT SYSTEM

This application is a continuation of international application Ser. No. PCT/FI98/00761, filed Sep. 25, 1998.

BACKGROUND OF THE INVENTION

The invention relates to electronic payment mechanisms in telecommunications networks and particularly to an electronic payment system comprising first processing means for generating electronic receipts corresponding to received payments, second processing means for receiving said receipts, and transfer means for transferring said receipts between the first and second processing means.

As the use of telecommunications networks has increased, the use of electronic payment mechanisms has become more common. In the near future, payments for different services, physical goods or information will be more and more often transferred between buyers and sellers in the form of electronic money. These are generally called electronic tokens.

The introduction of electronic payment systems has been delayed by uncertainty with respect to security. At the protocol level, development of standards has advanced considerably, and e.g. the SET standard (Secure Electronic Transaction), which will be introduced soon, comprises several encryption and authentication functions, by means of which data transmission related to transactions can be implemented reliably.

At the application level above the protocol level, practice and practical applications still vary greatly. Accordingly, several countries have drawn up rules and regulations to protect consumers against errors and abuse in connection with electronic transactions. For example, the United States has issued Regulation E stipulating that systems intended for carrying out electronic transactions must provide receipt of all transactions executed by the system and at regular intervals provide a written specification of transactions for the subscriber. This has been typically implemented in such a manner that after each transaction the system sends a record functioning as an electronic receipt to the unit that stores the subscriber's electronic tokens.

Such a receipt is fully sufficient for an ordinary subscriber who uses the electronic payment system for simple personal payments. There are, however, a large number of users whose payment transactions are more complicated, and therefore smooth registration, transfer and authentication of receipts is more important. For example, an employee, who can afterwards charge certain expenses from his employer, or a consult, who has several, projects at the same time and charges each project separately for his expenses, either has to acquire separate units (hereafter referred to as purses) for storing electronic tokens for each invoicing destination or is forced to waste time on storing, verifying, converting and transferring receipts for invoicing purposes at different destinations. The former way quickly becomes difficult to manage as the number of purses increases. The latter is time-consuming and does not allow the user to utilize benefits provided by advanced data transmission.

On the other hand, the end-receiver of the receipt, e.g. an employer, customer or tax authorities receiving tax-deductible bills, needs to be sure that the receipt is related to a real transaction and originates from the payee. It is difficult to acquire separate certified receipts, and in the case of small telephone bills this is even unprofitable. Certification based on a bank statement in turn weakens the invoicing person's information security, since in that case the person who receives the specification also receives information on all transactions related to the subscriber's purse.

BRIEF DESCRIPTION OF THE INVENTION

An object of the invention is to develop an electronic payment system, in which transactions involve a certified, undeniable electronic receipt, which can be easily transferred and by means of which the payer's information security can be protected with respect to other payments when the receipt is transferred. An electronic receipt substantially comprises information units represented by means of electric or magnetic charge levels, and these units can be read and written by means of electronic equipment.

The object of the invention is achieved with the electronic payment system described in the introduction, characterized in that first processing means are arranged to encrypt the electronic receipt to be generated or part of it, if necessary, with a public-key algorithm by using the payee's own secret key as an encryption key; and second processing means are arranged to decrypt a received receipt with a public-key algorithm by using the payee's public key as a decryption key.

The invention also relates to a method as claimed in claim 13 for acknowledging a transaction in the electronic payment system, which comprises first processing means for providing electronic receipts corresponding to payments, second processing means for receiving said receipts, and transfer means for transferring said receipts between the first and second processing means. The method is characterized in that said electronic receipts or parts of them are encrypted with a public-key algorithm by using the payee's private key as an encryption key; and receipts are decrypted with a public-key algorithm by using the payee's public key as a decryption key.

The invention is based on the system comprising means for encrypting an electronic receipt either completely or partially with a digital public-key algorithm. Encryption is carried out by using the payee's private key, whereby the encryption functions as an electronic signature in the receipt. If the recipient of the receipt wants to be convinced of the authenticity of the receipt, he decrypts the encryption with the payee's public key. The receipt is in electronic form, and thus it can be easily read and transferred between different destinations. Digital encryption with the payee's private key certifies the origin of the receipt undeniably. As long as the receipt is in encrypted form, it cannot be read if the payee is not known exactly, and counterfeiting of information included in the encrypted parts of the receipt is impossible.

The part of the receipt to be encrypted preferably comprises a transaction identifier, on the basis of which the seller can identify the transaction in his own transaction register, the sum paid and a description of the subject of payment. The encrypted text also preferably comprises a check field, by means of which it can be verified that the decryption has been correctly performed. Encryption can also be optional, whereby it is used only when the receipt is needed in certified form.

An advantage of the method and system of the invention is that users of the electronic payment system can provide undeniably certified receipts of transactions and transfer them to further processing, with maintaining the level of certification. Payments that are to be transferred to different destinations for storing or crediting can be paid from the same electronic purse regardless of the final payer, without having to compromise information security of the purse in connection with crediting of payments.

BRIEF DESCRIPTION OF DRAWINGS

In the following, the invention will be described in greater detail in connection with preferred embodiments with reference to the accompanying drawings, in which FIG. 1 is a block diagram illustrating the basic idea of the invention in principle;

FIG. 2 is a functional block diagram illustrating a preferred embodiment of the invention;

FIG. 3 is a signalling chart illustrating another preferred embodiment of the invention;

DETAILED DESCRIPTION OF THE INVENTION

Figure 4:
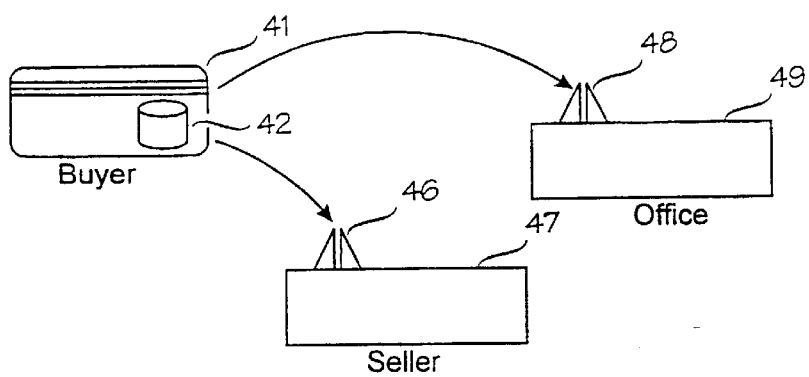
FIG. 4 is a block diagram illustrating a further preferred embodiment of the invention.

Referring to the block diagram in FIG. 1, the basic principle of the invention will be described in the following, and later on it will be illustrated with more detailed examples. An electronic receipt is part of an electronic transaction, in which a payment is made in the form of electronic tokens between the seller 10 and the buyer 12 via a telecommunications network 11. After the transaction the buyer 12 wants to transfer the receipt to destination 13 for further processing. As regards the basic idea of the invention, the seller's 10 and buyer's 12 equipment, detailed structure of the network 11 and protocols to be used are not relevant per se, provided that an electronic system supporting encryption based on a public key is involved.

In solutions of the prior art, in response to an accepted payment received from the buyer 12, the seller 10 generates an electronic receipt, typically a record, which is transferred to the buyer's 12 unit storing electronic tokens, i.e. a purse. When the buyer 12 wants to transfer the receipt to destination 13, he e.g. prints a record or a list of all records in his purse and sends a hard copy to the destination, or electronically transfers a copy of the record to destination 13. However, it is obvious that such an uncertified receipt can only be used in transactions based on mutual confidentiality, and as such is not valid for bookkeeping. Handling of hard copies in turn unnecessarily increases the amount of work needed for maintaining a purse.

In the invented solution the seller 10 generates a receipt and preferably provides the receipt with an identifier, which may be e.g. a running number, a time stamp or another string of characters and by means of which an entry corresponding to the receipt can be found afterwards in the seller's log. The receipt also preferably shows the transferred sum and a description of the transaction. After this, the seller's server encrypts the receipt or a selected of it by using the seller's private key as the encryption key. The part to be encrypted preferably comprises at least said identifier and the transferred sum.

The mathematical basis for encryption by means of a public key lies in one-way trapdoor functions. These are functions which are easy to solve in one direction and extremely difficult to solve in the opposite direction, but selected encrypted extra information substantially facilitates their solving in the difficult direction. Two keys are used in encryption: a -private key and a public key. Determining the private key on the basis of the public key by calculating is virtually impossible. In ordinary encryption the owner of the public key employs the easy direction and can encrypt information with the key, but cannot decrypt encrypted information. The private key is said extra information, by means of which the function can be solved in the difficult direction and by means of which an encrypted text can be decrypted.

In some public-key algorithms, encryption can be carried out either with the public or the private key, and decrypting in turn can be carried out with the other key. An example of this is the widely used RSA algorithm (Rivest, Shamir and Adleman). If a text is encrypted with the private key, and it can be adecrypted with the public key, encryption of the text functions as a reliable electronic signature. This electronic signature will be utilized in the electronic receipt of the invention.

The seller 10 transfers a record 11, which functions as a receipt and has been encrypted with the seller's private key, to the buyer 12 via the network 11. The buyer 12 can store receipts in the purse in encrypted form, or he can decrypt the encryption and store the plaintext receipt in his purse for the time desired, as normally. Due to the invention the buyer 12 can also transfer the receipt in encrypted form directly to destination 13, which decrypts the encryption by using the seller's public key as the decryption key. If the decryption succeeds normally, the destination 13 knows that the receipt in question is the receipt sent by the seller 10 and at least the information in the encrypted parts of the receipt, comprising preferably a seller-specific identifier, description of the payment and the sum paid, is definitely correct.

The buyer, on the other hand, is able to transfer receipts reliably and retrieve credits automatically already in connection with transactions. If the buyer 12 transfers the entire contents of the electronic purse to destination 13, the destination 13 can only decrypt those receipts from the purse whose seller and thus also the seller's public key are known to the destination. As regards other payments, information security is preserved. When expenses are credited on a continuous basis (e.g. an employer or a customer), an application can be defined between the buyer and the destination, by means of which any additional descriptions required by the bookkeeping practice of the destination can be directly added to the receipt, and thus the payment can be directly registered in the correct destination. The use of such an electronic payment system would allow e.g. anonymous payments, whereby information on the person who is the final payer is not needed in connection with transactions. At the same time, delay in crediting money can be minimized.

Management of public keys is an application-specific option and is not as such part of the basic idea of the invention. The buyer 12 can transfer the seller's public key to destination 13 with the receipt, or the server of the destination 13 can store public keys of those sellers whose receipts it is ready to accept. If necessary, a separate certification authority CA, which is responsible for the management of public keys and maintained by a reliable organization, can be connected to the network.

As was stated above, the invention can be applied to any electronic payment system which supports encryption based on a public key. One skilled in the art can implement the electronic receipt in several different ways. For example, the electronic receipt may be a record that can be stored in a memory card by means of a read/write unit. It can also be formed of one or more signals that are transferred via a telecommunications network. Since transferability of the receipt and easy further processing are the most obvious advantages of the invention, the invention will be described in greater detail in connection with mobile communication systems, without limiting the invention to the structure described, forms of connection or payment protocols mentioned as an example. In the following, one preferred embodiment of the invention will be described in greater detail by means of a payment system application arranged in the digital GSM mobile communication system. As to a more precise description of the GSM system, reference is made to GSM recommendations and *The GSM System for Mobile Communications*, M. Mouly and M. B. Pautet, Palaiseau, France, ISBN:2-9507190-0-7.

FIG. 2 illustrates in principle a functional block diagram of an electronic payment system, which according to the principles of the invention allows transfer of reliable electronic receipts between sellers 211, 212, 213, a buyer 261 and a destination 270 via a network 210, 220, 240.

The sellers 211, 212, 213 are connected to a public data network 220 via a local area network LAN 210. The blocks in FIG. 2 illustrate the sellers' computers or cash systems, by means of which the sellers handle their electronic transactions. In the invented solution, said computers and cash systems can preferably encrypt a selected text by a public-key algorithm. If the seller's terminal equipment cannot perform encryption, a server encrypting the receipt before it is sent to the buyer 261 via the public data network 220 can be connected to the local area network 210.

The buyer 261 has an MS 262 at his disposal, which is connected to a local area network LAN1 240 via a public mobile communication network (Public Land Mobile Network, PLMN), e.g. the GSM mobile communication network, and to the public data network 220 via the local area network. The local area network LAN1 240 may be e.g. a PLMN operator's own local area network. In connection with the local area network LAN1, there is a separate electronic currency short message service centre EC-SMSC, via which signalling related to the subscriber's 261 transactions takes place in the example under discussion.

In the mobile communication system, a traffic channel TCH has been defined for data or speech transmission between a base station and a mobile station, and control channels SDCCH (Standalone Dedicated Control Channel) and SACCH (Slow Associated Control Channel) for signalling between them. The control channels of the mobile communication system can be used for transmitting short digital data messages, i.e. short messages, between the mobile station and a short message service center SMSC connected to the system. The short message service centre is a centre connected to the mobile communication system, via which short messages are transmitted and in which they can be stored to be sent later on if the recipient is not reached. Messages sent by the short message service centre are received by the mobile services switching centre which functions as the gateway MSC for short message service of the GSM system and interrogates routing and short message information from the home location register and transmits a short message to be forwarded to the recipient's visitor location register. In the GSM system, for example, the maximum length of a short message is 140 bytes. A short message may be a mobile terminating short message transmission MT or a mobile originating short message transmission MO.

If the mobile station MS 262 has a connection on the traffic channel TCH, short messages are transmitted on the control channel SACCH. In other cases short messages are transmitted on the control channel SDCCH. Subscriber registers of the mobile communication system are used for routing short messages in a mobile communication network substantially in the same way as for routing calls. In the case of MT, messages from the public data network 220 to the mobile subscriber, which are in accordance with an electronic payment protocol, are first transmitted via the local area network LAN1 240 to the short message service centre EC-SMSC 250, which converts them into short messages of the mobile communication system PLMN 260 and transmits them to subscribers in the manner described above. In the case of MO, messages are transmitted via the mobile communication network PLMN 260 to the short message service centre EC-SMSC 250, from which, after a possible conversion, they are routed via the public data network to the address given by the subscriber.

In the example under investigation the mobile station MS employs some widely used payment protocol, which is also a protocol used by the sellers. The applicant's previous Finnish Patent Application 955354 discloses another arrangement in which a separate gateway unit transmitting transactions is connected between the parties, and the gateway unit carries out a protocol conversion between different payment service interfaces. One skilled in the art can select and provide an interface between payment protocols to be used in several different ways. With respect to the present invention this is not relevant, and hence the matter will not be dealt with in greater detail.

In FIG. 2, the diagram including block 262 illustrates a simplified structure of a mobile station MS. The radio part 265 comprises transmission and reception components for crossing a radio path, such as a radio transceiver, modulator, channel coder and decoder, etc. The signalling and control part 264 controls the whole operation of the mobile station. When communicating with the user said signalling and control part produces desired messages and takes care that that they are displayed on a display 267. Correspondingly, the signalling and control part 264 interprets and executes commands given by the user from a keyboard 266. Furthermore, the mobile station comprises at least one data base 263, which contains different subscriber-specific data.

In FIG. 2, the mobile station MS 262 comprises a data base DB 263, in which information related to subscriber-specific payment service is stored, e.g. information on the amount of electronic money (cash or credit) the subscriber has available and receipts related to transactions. This data group in the data base 263 is called an "electronic purse". In the present case, information is preferably stored in the identification unit of the mobile station MS, in the SIM card.

The subscriber identity module SIM is a unit, in which e.g. according to the GSM recommendations all information related to a mobile subscriber and included in the mobile station MS 262 are stored. The SIM may be a smart card, the interface of which with the outside world is in accordance with the ISO standard relating to IC cards, ISO 7816 series. A standard-size IC card SIM may be too large to be used in portable radio devices, and thus also a plug-in SIM can be used, which in the GSM system is a completely standardized special module, which is arranged in the equipment of a mobile station semi-permanently.

In the GSM system, a mobile subscriber is identified on the basis of the information in the SIM card. The storing capacity of the SIM card may allow storing and managing of additional information related to a mobile subscriber, besides GSM-specific services and features. Due to the support of digital public-key algorithms and storing capacity, the SIM card is particularly suitable for implementing the present invention.

The way of arranging the electronic purse in a mobile telephone network illustrated in FIG. 2 is only one of many alternatives. For example, in the applicant's previous Finnish Patent Application 955354 the control unit of the gateway server connected to the local area network 240 monitors buyers' payment service data bases, and the electronic purse is connected to said gateway unit and not directly to the mobile station. The electronic purse can also be included in the user's memory card or smart card, which he uses by means of publicly and privately used read/write units. The way of implementing the electronic purse is not relevant to the invention, but can be implemented specifically for each application by one skilled in the art. The essential thing is that the user has an electronic purse at his disposal, in which information can be stored on transactions, and information stored in it can be read and deleted temporarily or permanently by means of an interface unit that can be connected to it.

In the following, a closer look will be taken at a case in which the subscriber 261 orders a service or another commodity from the seller 212. The seller's 212 computer or cash system sends a message requesting a sum of money corresponding to the value of the service to the network address received from the buyer 261. Due to this network address the message is routed via the local area network LAN2, public data network 220 and local area network LAN1 to the short message service centre EC-SMSC 250 functioning in the subscriber's 261 mobile communication system. The short message service centre converts the message into a short message and sends it to the mobile station MS 262 via the public mobile telephone network PLMN 260. The operating system of the mobile station comprises a payment protocol interface, by means of which functions related to transactions are carried out. The control unit of the mobile station checks in the data base 263 whether there is a sufficient amount of money in the buyer's electronic purse to pay the requested sum. If the amount of money is insufficient, the control unit generates a rejection message, which is sent to the seller 2 via the network. If there is a sufficient amount of money in the data base 263, the control unit generates a message containing a request for payment onto the display. The user accepts the payment by means of the keyboard 266, whereby the control unit transfers the desired sum of money from the data base DB 263 via the network to the seller 212 according to the payment protocol used between buyers and sellers.

Having received the payment the seller 212 generates a receipt, which is substantially in accordance with the used payment protocol and includes essential information on the transaction. Information in the receipt may vary depending on the application, but it preferably contains a transaction identifier, description, sum and check field indicating the correct decryption. The transaction identifier ID is a string of characters, which has been attached to the receipt by the seller, and on the basis of which the receipt can be unequivocally retrieved from the seller's log. The identifier may be based e.g. on a time stamp or a running number or on a combination of these. The description of payment is a string of characters, which is in plaintext or coded and describes the subject of transaction. Such a description may be selected specifically for each application, but could typically be e.g. a "hotel bill" or a "taxi journey" or a pre-selected code corresponding to the use. The check field preferably contains a pre-fixed value or a feature of the string of characters on the basis of which it can be immediately concluded that decryption has succeeded or failed by comparing the check field achieved as a result of decryption with the pre-fixed value.

Having generated the receipt the seller 212 encrypts it by using a public-key algorithm. Such a public-key algorithm is e.g. the widely used RSA algorithm. To ensure that the encryption undeniably certifies the signature in the receipt, the seller's 212 cash system encrypts the receipt by using the seller's private key as the encryption key. After this, the receipt is sent via the local area network 210 and public data network 220 to the short message service centre EC-SMSC 250 of the mobile communication system, from which it is sent as a short message via the mobile telephone system to the mobile station MS 262. When detecting the received receipt the signalling and control part of the mobile station MS 262 generates a message to the display 267 of the mobile station to inform the buyer 261 of the reception of the receipt and to request instructions for further processing of the receipt. By using his keyboard 266 the buyer keys in instructions telling whether the receipt is to be stored in the data base DB 263 of the mobile station for later use or whether it will be immediately forwarded to further processing.

A public key is needed for decrypting an encrypted receipt into plaintext form. The file in which the sellers' identities and public keys relating to them are stored will be called certification authority CA in the following. A certification authority can be implemented specifically for each application in the way desired by one skilled in the art. It may be e.g. a file maintained by the users of the payment system in connection with the electronic purse, cr it can be implemented as a service of a reliable organization, or even as a service provided by the authorities. In the present example, the certification authority CA is placed in connection with the equipment (mobile stations, cash systems) of the users (buyers and sellers) of the payment system; however, the invention is not limited to this alternative.

If the receipt is not forwarded, it is stored in encrypted form in the electronic purse DB 263, whereby it can later on be retrieved to be forwarded, if necessary. To make receipts identifiable in the log of the electronic purse, a plaintext identifier, which can be freely selected, can be added to the receipts. The identifier may be e.g. a string of text, abbreviation related to the transaction, or the sum of the payment. The seller can suggest an identifier to be used in the buyer's log in a message sent by him, and on receiving the receipt the buyer can either accept or refuse the identifier.

If the subscriber 261 has electronically paid a bill, which he wants to transfer to be credited from his office's bookkeeping 270, he gives a command by means of his keyboard, in response to which the control unit generates a message including a request for credit and sends it to the office's network address. If the bookkeeping 270 accepts the request and agrees to credit the sum, the receipt in encrypted form and the seller's identity is sent to destination 270. The bookkeeping has a certification authority CA 275 at its disposal, from which the seller's public key is retrieved on the basis of the seller's identity. The receipt is decrypted with said public key. If decryption of the receipt with the public key succeeds and the check field possibly included in the receipt provides the expected value, the bookkeeping accepts the receipt and sends electronic tokens corresponding to the value of the sum to be credited to the subscriber's 261 electronic purse 263.

The signalling chart in FIG. 3 illustrates the process described above. Processing of the character string T with an RSA algorithm by using the seller's S public key is denoted by S(T) in the chart, and processing of the character string T with an RSA algorithm by using the seller's private key is denoted by $S^{-1}(T)$. On the basis of this it is obvious that $$S(S^{-1}(T))=T.$$

When trading, the buyer 261 sends a payment to the seller 212 in the form of electronic money (signal 3.1). The seller generates a receipt and encrypts it digitally by using his private key, which is totally secret from everybody else. The seller sends the encrypted receipt to the buyer (signal 3.2), who forwards the encrypted receipt and the seller's identity to the destination (signal 3.3), i.e. to his office's bookkeeping 270. The bookkeeping 270 gives the seller's identity to the certification authority CA 275 (signal 3.4), which returns the seller's public key to the bookkeeping (signal 3.5). The bookkeeping decrypts the receipt, and if encryption succeeds and the receipt's check field gives a value on the basis of which it can be concluded that the encryption has been correctly decrypted, an amount of electronic money corresponding to the sum to be credited is transferred to the buyer (signal 3.6). The transferred sum is stored in the electronic purse 263 included in the buyer's 261 mobile station.

If the buyer does not need a credit, but wants to transfer a tax-deductible receipt to be attached to his tax return, the procedure is mainly similar to that described above (signals 3.1–3.5). The buyer makes a payment (3.1), the seller generates a receipt (3.2), the buyer transfers the receipt and the seller's identity to the destination (3.3), which in this case is the tax authorities' taxpayer-specific file in the data base of the tax administration. The tax authorities send the seller's identity to the certification authority (3.4) and receive the seller's public key in response (3.5). The tax authorities store the receipts and decrypt them when the information is transferred to the tax payer's tax information at the latest.

Another alternative for storing tax-deductible receipts is to establish an electronic receipt purse in connection with a bank, tax authorities or in another reliable place. The taxpayer transfers tax-deductible receipts to this purse during the tax year. In the receipt purse, receipts can be stored as encrypted, and the encryption can be decrypted, and a specification certified by the keeper can be printed of the receipts when a tax return is filled.

One embodiment of the invention is a certified hard copy of an electronic receipt. A reliable organization, e.g. a bank to which an encrypted receipt can be sent in order to receive a hard copy, can be added to the arrangement. The bank carries out the normal functions relating to the destination (signals 3.4–3.5). The receipt is printed and the printout is provided with the bank's certification. After printing has been completed, the bank destroys the electronic receipt.

Figure 5:
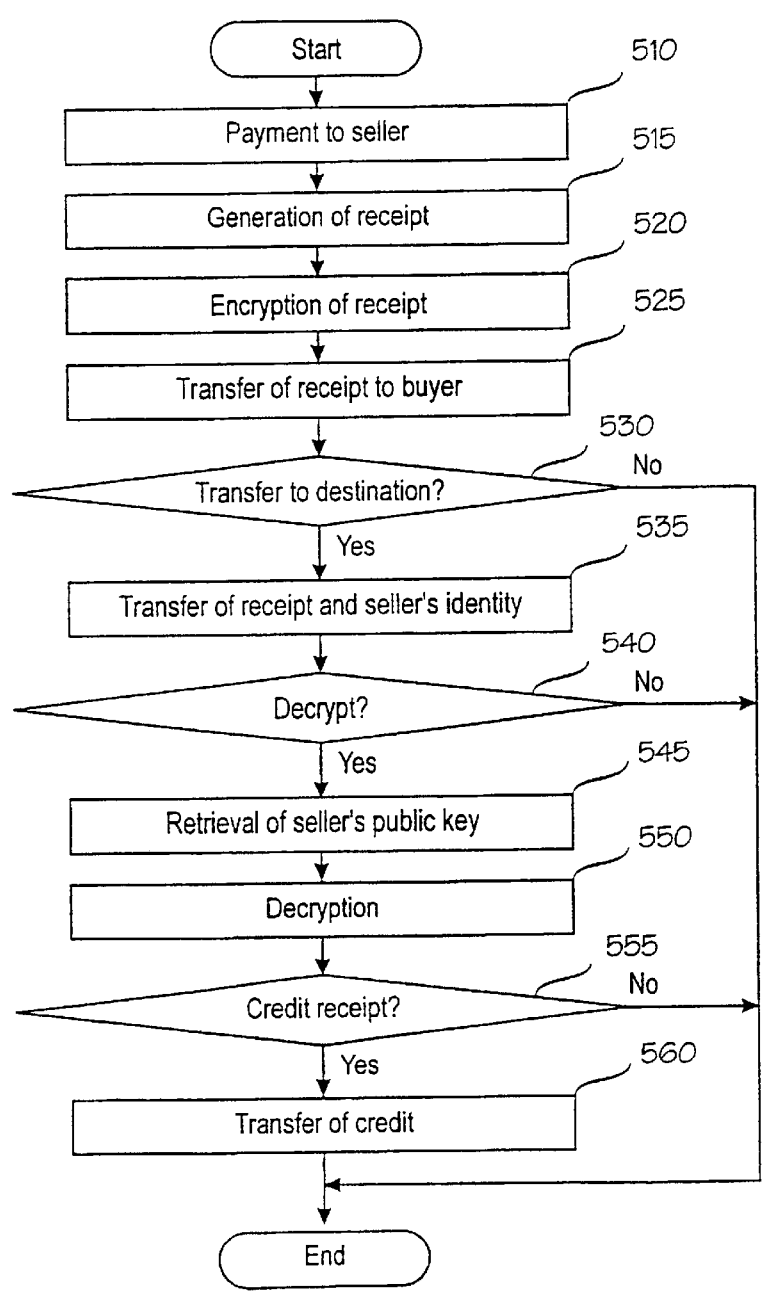
FIG. 5 is a flow chart illustrating a method of the invention in connection with the embodiment illustrated in FIG. 4.

The method of the invention is illustrated with the block diagram in FIG. 4 and the flow chart in FIG. 5. The example describes a case in which the buyer pays his employer's expenses with his own card and afterwards charges them from his employer. In the arrangement illustrated in FIG. 4 the seller has a cash system 47 at his disposal, and a read/write unit 46 capable of handling buyers' cards is connected to it. In connection with payment the buyer gives his card 41 used as the means of payment to the seller, who reads the contents of the electronic purse 42 included in the card 41 and charges a certain sum from the purse 42. At the same time, the seller's system 47 generates a receipt corresponding to the sum, encrypts it by using his private key as the encryption key, and stores the receipt in the buyer's electronic purse 42. When the buyer goes to the office next time, he gives his card to the employer, who reads the receipt stored in the electronic purse 42 of the card 41 with a read/write unit connected to his system, and after accepting the payment credits a sum corresponding to the receipt to the buyer's electronic purse 42.

The flow chart in FIG. 5 illustrates application of the method of the invention to the above example. In step 510 the seller charges a number of electronic tokens corresponding to the agreed sum from the buyer's electronic purse.

Having received the payment the seller generates a receipt corresponding to the sum (step 515), encrypts the receipt or a selected part of it by using his private key as the encryption key (item 520) and stores the receipt in the buyer's electronic purse (item 525). In the figure, broken lines indicate those periods between the steps of the method the length of which may vary. The steps of the method may follow one another immediately, or a longer time may lapse between the steps depending on the buyer's actions.

If the buyer wants to recover the sum he has paid (step 530), he gives his card to his employer, who reads the contents of the electronic purse included in the card with a read/write unit connected to his system (step 535). Since the receipts are encrypted, the employer cannot read them without extra information. Having received the seller's identity from the buyer the employer can retrieve the seller's public key from the data base of his system or from an outside data base maintained by a reliable organization (step 545) to allow the receipt to be decrypted (step 550). The employer can decode the encryption of only those receipts that originate from a seller identified by the buyer. On the basis of the plaintext receipt the employer can decide whether the expenses involved are to be credited to the employee (step 555). Crediting is performed by storing a number of electronic tokens corresponding to the receipt in the buyer's electronic purse (step 560).

One available alternative is to provide the seller's and the office's systems with a read/write unit. The read/write unit can be connected to the buyer's computer or mobile station, whereby transactions and related data transmission can be carried out via the public data network e.g. in the manner illustrated in FIG. 2.

The present certified electronic receipt can also be arranged to be optional, whereby the buyer can determine in connection with a transaction whether he wants to have a certified receipt or whether an ordinary plaintext receipt is sufficient. The receipt of the invention, certified with a public-key algorithm, is provided only when the payer requests it.

On the basis of what has been said above it is obvious to one skilled in the art that the basic idea of the invention can be implemented and applied in several different ways as the technology develops. Thus the invention and its embodiments are not limited to the above examples, but may vary within the scope of the appended claims.

What is claimed is:

1. An electronic payment system comprising:

first payment means for making payments in electronic form, first processing means for generating electronic receipts corresponding to received payments, the first processing means being arranged to encrypt the electronic receipt to be generated or part of it, if necessary, with a public-key algorithm by using the payee's private key as an encryption key, wherein an electronic receipt which is partly of completely encrypted does not contain unencrypted identification data on the payee, second processing means for receiving said receipts, the second processing means being arranged to decrypt a received receipt with a public-key algorithm by using the payee's public key as a decryption key, and transfer means for transferring said receipts between the first and second processing means and the first payment means, wherein the first processing means are arranged to transfer the generated electronic receipts to the first payment means in response to the payments made by means of the transfer means, and the first payment means are arranged to transfer one or more of said receipts to the second processing means by means of the transfer means, and when transferring one or more of said receipts to the second processing means, the first payment means are arranged to transfer with the receipts only the payee's identification data related to the receipts that the second processing means are entitled to decrypt.

2. The electronic payment system as claimed in claim 1, wherein said second processing means are arranged to transfer a sum corresponding to the received and decrypted electronic receipt to said first payment means, if necessary.

3. The electronic payment system as claimed in claim 1, wherein said first processing means comprise the seller's cash system, and said second processing means comprise the cash system of the final recipient of the receipt.

4. The electronic payment system as claimed in claim 3, wherein said first payment means comprise a memory card or a smart card, and said transfer means comprise read/write interfaces of the cards related to cash systems.

5. The electronic payment system as claimed in claim 3, wherein said first payment means comprise a mobile station, and said transfer means comprise at least one of the following: a mobile communication network related to the mobile station, public data network, local area network related to said first or second processing means.

6. The electronic payment system as claimed in claim 5, wherein said transfer means also comprise a short message service centre connected to the mobile communication network for transferring electronic receipts to the mobile station by means of a short message service.

7. The electronic payment system as claimed in claim 1, wherein the system comprises at least one certification authority for maintaining public keys of the units connected to the system.

8. The electronic payment system as claimed in claim 7, wherein one or more of the units connected to the system maintain a certification authority of their own.

9. The electronic payment system as claimed in claim 1, wherein said first processing means are arranged to enter transactions in a log and include an identifier on the basis of which a transaction can be retrieved from said log in the part of the electronic receipt to be encrypted.

10. The electronic payment system as claimed in claim 9, wherein said first processing means are arranged to include a part showing the paid sum in the encrypted part of the electronic receipt.

11. A method for acknowledging a transaction in an electronic payment system comprising first payment means for making payments in electronic form, first processing means for providing electronic receipts corresponding to payments, second processing means for receiving said receipts, and transfer means for transferring said receipts between said first and second processing means and the first payment means, the method comprising:

encrypting said electronic receipts or parts of them in the first processing means with a public-key algorithm by using the payee's private key as an encryption key, wherein an electronic receipt which is partly or completely encrypted does not contain unencrypted identification data on the payee, transferring the encrypted electronic receipts from the first processing means to the first payment means, transferring one or more of said receipts from the first payment means to the second processing means in such a way that only the payee's identification data related to the receipts that the second processing means are entitled to decrypt are transferred with the receipts, and decrypting receipts in the second processing means with a public-key algorithm by using the payee's public key as a decryption key.

12. The method as claimed in claim 11, wherein a sum corresponding to the received and decrypted electronic receipt is transferred to said first payment means.

13. The method as claimed in claim 12, wherein the electronic receipt is transferred in the mobile communication system by means of a short message service.

14. The method as claimed in claim 11, wherein transactions are entered in a log and the identifier which is provided by said first processing means and on the basis of which the transaction can be retrieved from said log is included in the part of the electronic receipt to be encrypted.

15. The method as claimed in claim 14, wherein a part showing the paid sum is included in the encrypted part of the electronic receipt.

\* \* \* \* \*